US010231477B1

(12) United States Patent
Salvatori et al.

(10) Patent No.: US 10,231,477 B1
(45) Date of Patent: Mar. 19, 2019

(54) THREE-DIMENSIONAL PRINTER FOR PRINTING EDIBLE PRINTING MATERIALS AT ROOM TEMPERATURE WITH ADJUSTABLE PRINTING POSITIONS AND TARGETS FOR PRECISE PRINTING

(71) Applicant: Marvell International Ltd., Hamilton (BM)

(72) Inventors: Phillip Salvatori, Salem, OR (US); Jeffrey S. James, Escondido, CA (US); Justin Sykes, Boise, ID (US)

(73) Assignee: Marvell International Ltd., Hamilton (BM)

( * ) Notice: Subject to any disclaimer, the term of this patent is extended or adjusted under 35 U.S.C. 154(b) by 244 days.

(21) Appl. No.: 15/187,537

(22) Filed: Jun. 20, 2016

Related U.S. Application Data

(60) Provisional application No. 62/184,986, filed on Jun. 26, 2015.

(51) Int. Cl.
*A23P 30/20* (2016.01)
*B33Y 30/00* (2015.01)
*B33Y 40/00* (2015.01)

(52) U.S. Cl.
CPC ........... *A23P 30/20* (2016.08); *B33Y 30/00* (2014.12); *B33Y 40/00* (2014.12)

(58) Field of Classification Search
CPC ........ A23P 30/20; B29C 64/20; B29C 64/205
See application file for complete search history.

(56) References Cited

U.S. PATENT DOCUMENTS

| 5,744,185 | A | * | 4/1998 | Schaaf | A21C 9/04 |
| --- | --- | --- | --- | --- | --- |
| | | | | | 118/15 |
| 5,795,395 | A | * | 8/1998 | Ben-Matitayhu | A23G 3/20 |
| | | | | | 118/13 |
| 5,834,047 | A | * | 11/1998 | Ahn | A23G 3/2023 |
| | | | | | 426/383 |
| 6,058,843 | A | * | 5/2000 | Young | B41J 2/01 |
| | | | | | 101/483 |
| 10,092,020 | B2 | * | 10/2018 | Ream | A23G 3/0021 |

(Continued)

FOREIGN PATENT DOCUMENTS

WO     2014190168     11/2014

OTHER PUBLICATIONS

"Pre-Interview First Office Action", U.S. Appl. No. 15/187,510, dated Feb. 22, 2018, 3 pages.

(Continued)

*Primary Examiner* — James Sanders

(57) ABSTRACT

The present disclosure describes apparatuses and techniques for room temperature three-dimensional (3D) printing using edible printing materials. In some aspects, a 3D printer includes a printing platform configured to receive the extruded edible printing material from the printing cartridge, a cartridge receiver configured to hold an integrated printing cartridge that contains an edible printing material that can be extruded at room temperature, and a printing target. The position of the printing platform can be adjusted vertically and the position of the cartridge receiver can be adjusted in a plane perpendicular to the printing platform. The printing target is configured to allow extrusion of the edible printing material at precise and repeatable locations.

16 Claims, 11 Drawing Sheets

(56) References Cited

U.S. PATENT DOCUMENTS

| | | | |
|---|---|---|---|
| 2001/0046535 A1* | 11/2001 | Bowling | A21C 14/00 426/87 |
| 2013/0034633 A1* | 2/2013 | von Hasseln | A23P 30/00 426/104 |
| 2014/0117585 A1 | 5/2014 | Douglas et al. | |
| 2016/0106142 A1 | 4/2016 | Contractor et al. | |

OTHER PUBLICATIONS

"Sugarviel Airpen Piping Dispenser (usage instructions from manufacturer)", You Tube Video (Mar. 21, 2015) https:// www youlube com/watch?v=cVi09Ba7YeM Also Patented 1996 (U.S. Pat. No. 5,579,960) (Year 2015), 3 pages.

"First Action Interview Office Action", U.S. Appl. No. 15/187,510, dated May 23, 2018, 3 pages.

"Restriction Requirement", U.S. Appl. No. 15/187,546, dated Aug. 3, 2018, 5 pages.

"Restriction Requirement", U.S. Appl. No. 15/187,524, dated Jun. 4, 2018, 6 pages.

"Final Office Action", U.S. Appl. No. 15/187,510, dated Nov. 16, 2018, 13 pages.

* cited by examiner

THREE-DIMENSIONAL PRINTER FOR PRINTING EDIBLE PRINTING MATERIALS AT ROOM TEMPERATURE WITH ADJUSTABLE PRINTING POSITIONS AND TARGETS FOR PRECISE PRINTING

CROSS REFERENCE TO RELATED APPLICATIONS

This present disclosure claims priority to U.S. Provisional Patent Application Ser. No. 62/184,986 filed Jun. 26, 2015, the disclosure of which is incorporated by reference herein in its entirety.

BACKGROUND

This background description provides context for the disclosure. Unless otherwise indicated, the approaches described in this section are not prior art to the claims in this disclosure and are not admitted to be prior art by inclusion in this section.

Three-dimensional (3D) printing has become much more common. Yet, despite its increasing availability, 3D printing often remains a time-consuming and expensive endeavor, at least partly because of the wide variety of technology related to both the printers and the printing materials (e.g., plastics, powdered metal, and wax). Because of this variation, 3D printers are often engineered to take advantage of a particular print technology or printing material. This specialization typically leads to printers that are heavy, complex, and expensive because they include multiple motors, customized printing tips, and heating elements.

Additionally, 3D printers present safety concerns for users. Current 3D printers often include automated moving parts—the printing tip, the printing platform, and so forth. These parts move automatically and could cause an injury to a user. Further, current 3D printers typically require heated components (e.g., the printing tip) and may run at temperatures high enough to cause injury. Consequently, current printers also require additional safety equipment, including labels to warn users about hot components and moving parts, along with covers, guards, lockout mechanisms, sensors, and so forth.

SUMMARY

This summary is provided to introduce subject matter that is further described below in the Detailed Description and Drawings. Accordingly, this Summary should not be considered to describe essential features nor used to limit the scope of the claimed subject matter.

A three-dimensional (3D) printer configured to print edible goods by extruding edible printing material at room temperature is described. The 3D printer includes a printer frame, a printing platform connected to the printer frame and including a printing target enabling an item to be placed on the printing platform at a precise and repeatable location. The printing platform can receive inputs that adjust the position of the printing platform in a vertical direction. The 3D printer also includes a cartridge receiver connected to the printer frame. The cartridge receiver is configured to hold a printing cartridge containing an edible printing material that has a viscosity allowing the edible printing material to be extruded at room temperature. The cartridge receiver can receive inputs that adjust the position of the cartridge receiver.

Another three-dimensional (3D) printer configured to print edible goods by extruding edible printing material at room temperature is also described. The 3D printer includes a cartridge receiver connected to a printer frame and configured to hold a printing cartridge containing an edible printing material that is storable at room temperature and has a viscosity that allows the edible printing material to be extruded at room temperature. The 3D printer also includes a rotatable printing platform connected to the printer frame and configured to receive an input that adjusts the position of the rotatable printing platform in a vertical direction. The rotatable printing platform is also capable of receiving an item on which the edible printing material can be printed and includes a printing target that enables items to be placed on the rotatable printing platform at a precise and repeatable location.

A removable printing platform for a three-dimensional (3D) printer is also described. The removable printing platform includes a printing target comprising a printing surface that includes multiple recessed grooves that are arranged concentrically around a rotational axis of the printing target. The printing target enables an item to be placed at a precise and repeatable location for printing. The removable printing platform also includes a connector configured to enable the printing target to be rotatably connected to the 3D printer and adjustable in a vertical direction.

The details of one or more implementations are set forth in the accompanying drawings and the description below. Other features and advantages will be apparent from the description and drawings, and from the claims.

BRIEF DESCRIPTION OF THE DRAWINGS

The details of one or more implementations of methods and apparatuses for printing edible printing materials at room temperature are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

This disclosure describes methods and apparatuses for printing edible printing materials at room temperature to provide an improved user experience by reducing cost, complexity, or safety hazards. By way of example, consider a user who wants to use a confectionary 3D printer to allow children to print frosting on a cookie. Some currently available 3D printers are technologically suitable for printing edible material, but are impractical or unsafe for a child's use. These current printers are not only expensive, they are also relatively sophisticated, with complex user interfaces and many moving parts. Furthermore, even if a child could, with supervision, use such a printer, current confectionary printers often require substantial cleanup and labor to switch between different edible materials, such as when a child wants to print multiple colors or flavors of frosting.

In contrast, consider a comparatively portable, simple, and inexpensive 3D printer described herein. This 3D printer can print frostings, batter, and other edible materials for making or decorating cookies, cupcakes, and so forth. To do so, integrated printing cartridges are used, which are self-contained and customized for their edible material contents. For example, a particular color and flavor combination to be printed can be selected and manually inserted into the 3D printer. A printing platform, which includes targets for easy and accurate placement of a dessert (e.g., a cookie or cupcake) is provided with the printer. The dessert is placed on the platform and simple manual controls allow the user to extrude the edible printing material onto the dessert. The position of the cookie can be manually adjusted via rotation of the printing platform and the position of the printing cartridge can also be adjusted to provide user control over the extrusion. The edible printing material is shelf stable and has a viscosity that allows extrusion at room temperature, so multiple printing cartridges can be kept in the work environment, which allows the user to have a wide selection of decorating options. Additionally, because there are no heating elements, the user is not at risk of being burned by a hot component.

The following discussion describes an operating environment, various devices that may be employed in the operating environment, and techniques for using the various devices, followed by example integrated printing cartridges and an example 3D printer. In the discussion below, reference is made to the operating environment by way of example only.

Figure 1:
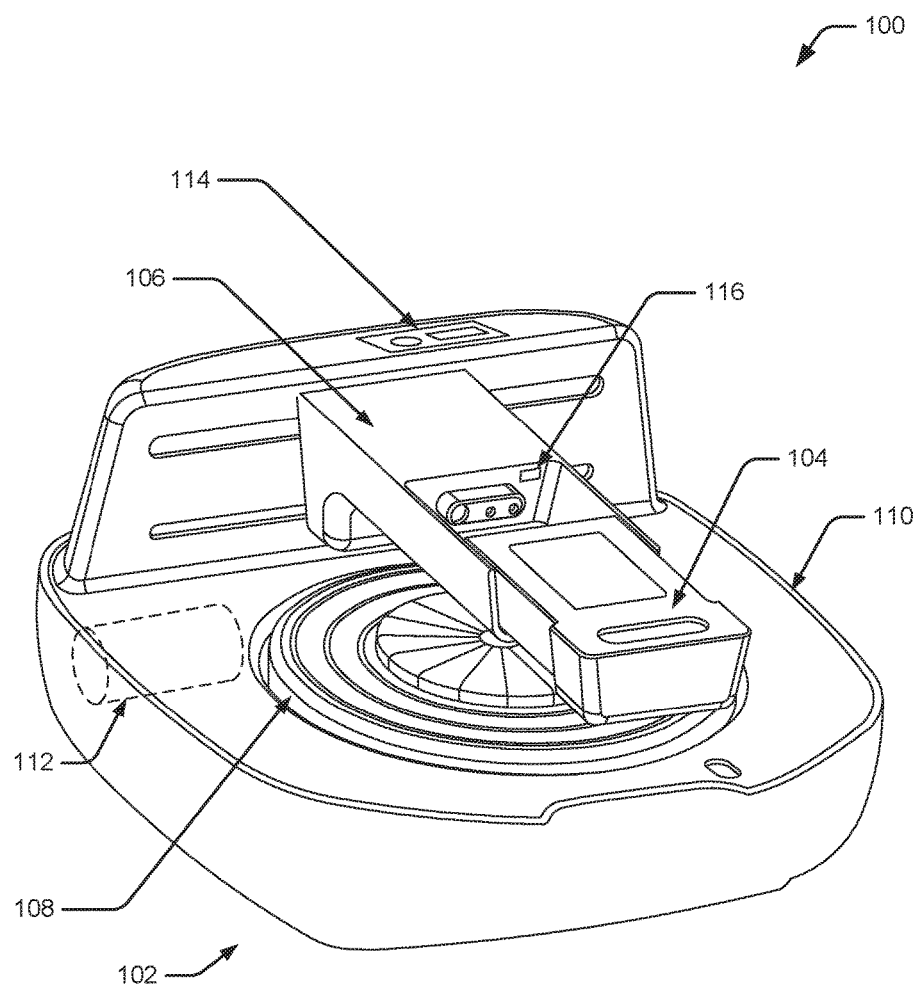
FIG. 1 illustrates an example three-dimensional (3D) printing system in which an integrated printing cartridge can be implemented in accordance with one or more aspects.

FIG. 1 illustrates an example three-dimensional (3D) printing system 100, including a 3D printer 102 and an integrated printing cartridge 104. The 3D printer 102 includes a cartridge receiver 106 and a printing platform 108. The 3D printer 102 further includes a printer frame 110 and may also include an actuator 112, a user interface 114, and/or an electronic identification (ID) reader 116. Other features are also described in this specification and the accompanying figures.

Figure 2:
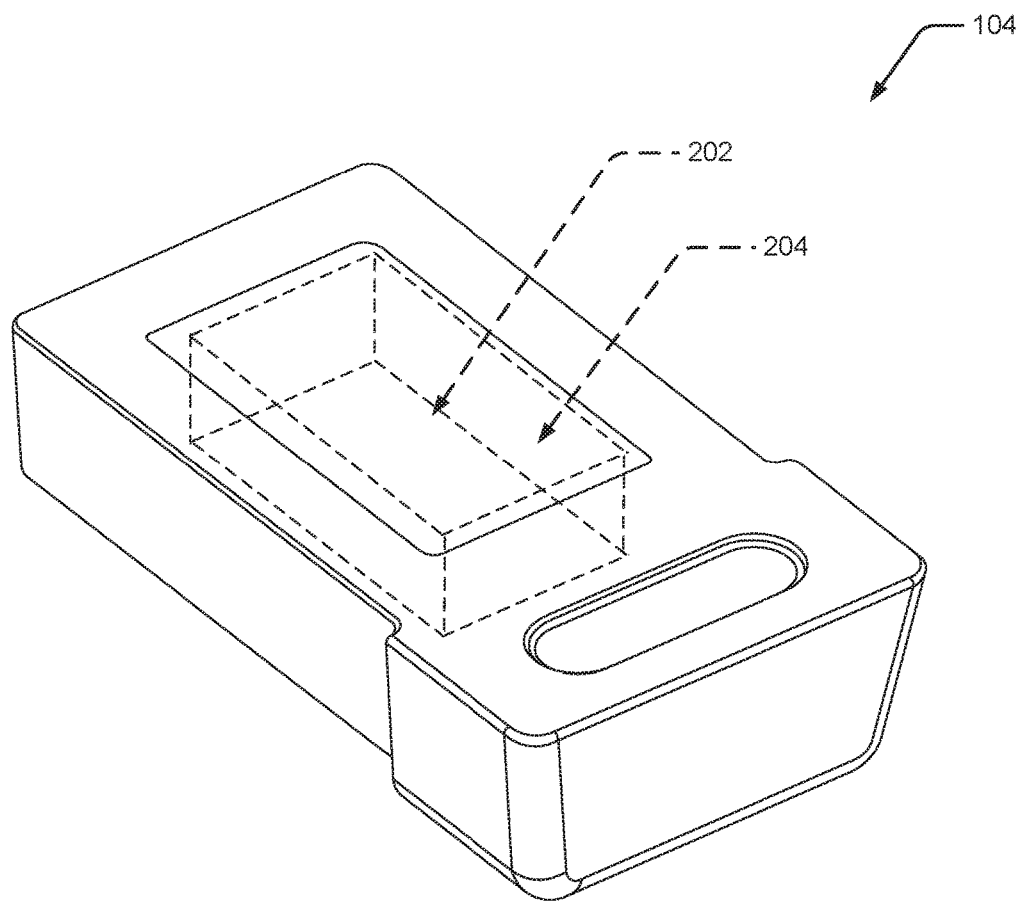
FIG. 2 illustrates a first view of an example configuration of the integrated printing cartridge shown in FIG. 1.
Figure 3:
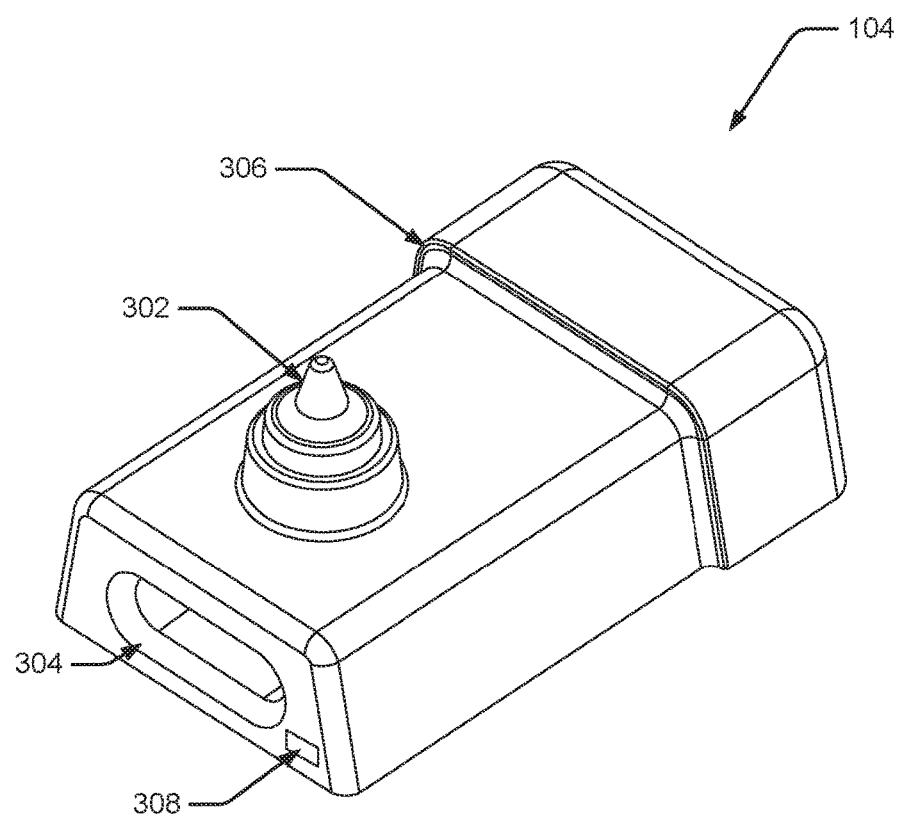
FIG. 3 illustrates a second view of the example configuration of the integrated printing cartridge shown in FIGS. 1 and 2.

FIGS. 2 and 3 illustrate views of an example configuration of the integrated printing cartridge 104 of FIG. 1. In the example configuration, the printing cartridge 104 includes a material reservoir 202 and edible printing material 204 contained within the material reservoir 202 (shown in FIG. 2 with dashed lines).

As shown in FIG. 2, the material reservoir 202 is a chamber within the printing cartridge 104. While depicted as a rectangular solid of a particular size, the material reservoir 202 may be other shapes and/or sizes, depending upon factors related to the printing cartridge 104 or the edible printing material 204, including flavor, color, and so forth. The edible printing material 204 may be shelf-stable (i.e., it may be stored at room temperature) and have a viscosity that is suitable to allow the edible printing material to be extruded, e.g., through a printing tip, at room temperature.

As shown in FIG. 3, with a different view, a printing tip 302 may be integrated with the printing cartridge 104. While not expressly shown in the view of FIG. 2, the printing tip may be in fluid communication with the material reservoir 202. In some embodiments, the printing tip 302 may be removable and replaceable to allow the same printing cartridge 104 to be used with different printing tips. The printing tip 302 is configured to enable the extrusion of edible printing material 204 through the printing tip 302 without requiring an increase in the temperature of the printing tip 302 or of the edible printing material 204. A port 304 is integrated with the printing cartridge 104 and is configured to receive an actuation force that may act upon edible printing material 204, through the port 304, to extrude the edible printing material 204 through the printing tip 302 at room temperature.

As noted above, conventional 3D printing typically requires the addition of heat to one or both of the printing tip and the printing material (e.g., plastic, wax, and so forth). Besides presenting a safety hazard, adding heat requires a heat source, such as a heating element, along with increased power consumption, weight, and cost. Because the printing cartridge 104 and the edible printing material 204 are configured to enable room temperature printing, the printing cartridge 104 described in this specification does not require a heating element. The lack of a heating element can reduce a user's risk of injury from a hot component. Throughout this document, "room temperature" refers generally to a range of temperatures from 50 degrees Fahrenheit to 90 degrees Fahrenheit or 65 degrees Fahrenheit to 80 degrees Fahrenheit.

The actuation force described above enables extrusion of the edible printing material 204. The actuation force may be air pressure acting through the port 304 to apply force to the edible printing material 204. In this example, the edible printing material 204 in the material reservoir 202 is further contained within a flexible pouch (made from, e.g., plastic, coated paper, or other flexible material) that is in fluid communication with the printing tip 302. The air pressure acts on the surface of the pouch within the reservoir 202 to extrude the edible printing material 204 through the printing tip 302. In another embodiment of the printing cartridge 104, the port 304 may be configured to receive a mechanical structure, or the above pressurized air, to move a pressure plate. The actuation force acts via the motion of the pressure plate to apply pressure to the edible printing material 204 and the pressure is constrained to the edible printing material 204 by the material reservoir 202. In either example above, the port 304 may be an orifice in the printing cartridge 104 that provides a sealable pathway for the air pressure. The port 304 may further include a valve and/or members that are configured to direct and distribute the air pressure (e.g., vents or baffles).

The printing cartridge 104 may also include exterior features to aid in alignment and seating of the printing cartridge 104 in a host printing device. For example, FIGS. 2 and 3 illustrate an exterior alignment and seating feature 306 as a ridge on the body of the printing cartridge 104. The exterior alignment and seating feature 306 seats against an edge of cartridge receiver 106, as shown generally on FIG. 1, and provides an indication that the printing cartridge 104 is properly seated as well as protection from excess insertion force. The printing cartridge 104 may further include other features (not shown on FIGS. 1-3) such as a tab to engage a slot, or a raised surface to provide a friction fit against the side walls of the cartridge receiver 106.

The printing cartridge 104 may be customized for a specific edible printing material 204. For example, the geometry of the printing tip 302, including the shape and volume of the body of the printing tip 302 and/or the shape of the extrusion opening, may be customized for a particular viscosity of the edible printing material 204. As noted above, the printing tip 302 may be removable, which facilitates customization of the printing cartridge 104 based on the printing tip 302. Another way to customize the printing cartridge 104 may be via material selections. For example, the material used to make the printing tip 302 may be customized based upon coefficients of friction and viscosity of the edible printing material 204, and/or the material used to make the material reservoir 202 may be customized based upon the compressibility of the edible printing material 204.

The printing cartridge 104 may further include an electronic identification (ID) 308. The electronic ID 308 may provide compatibility information to a 3D printer, which enables the integrated printing cartridge 104 to operate with the 3D printer. For example, the compatibility information may indicate the composition and viscosity of the edible printing material 204, and/or a magnitude and a velocity for the actuation force, based upon the properties of the edible printing material 204. The electronic ID 308 may take any of a number of forms, including an electronically readable bar code, a passive radio-frequency identification (RFID) tag, a microchip, and so forth.

By way of review, the above-noted example three-dimensional (3D) printing system 100 of FIG. 1 includes the 3D printer 102 and the integrated printing cartridge 104. The 3D printer 102 includes the cartridge receiver 106 and the printing platform 108. The 3D printer 102 further includes the printer frame 110 and may also include the actuator 112, the user interface 114, and/or the electronic identification (ID) reader 116. The 3D printer 102 is configured to provide an actuation force to the printing cartridge 104 to extrude edible printing material from the printing cartridge 104 at room temperature. The printer frame 110 provides a common structure to connect the components of the 3D printer 102. The cartridge receiver 106 is mechanically connected to the printer frame 110 and is configured to receive the printing cartridge 104. The actuator 112 provides the actuation force, which can be air pressure or mechanical pressure. For example, the actuator 112 may be an electric motor, an air compressor, and so forth. The actuator 112 may be a single drive motor or multiple drive motors configured to generate the actuation force, rotate the printing platform 108, provide horizontal motion to the cartridge receiver 106, or combinations of those functions.

Figure 4:
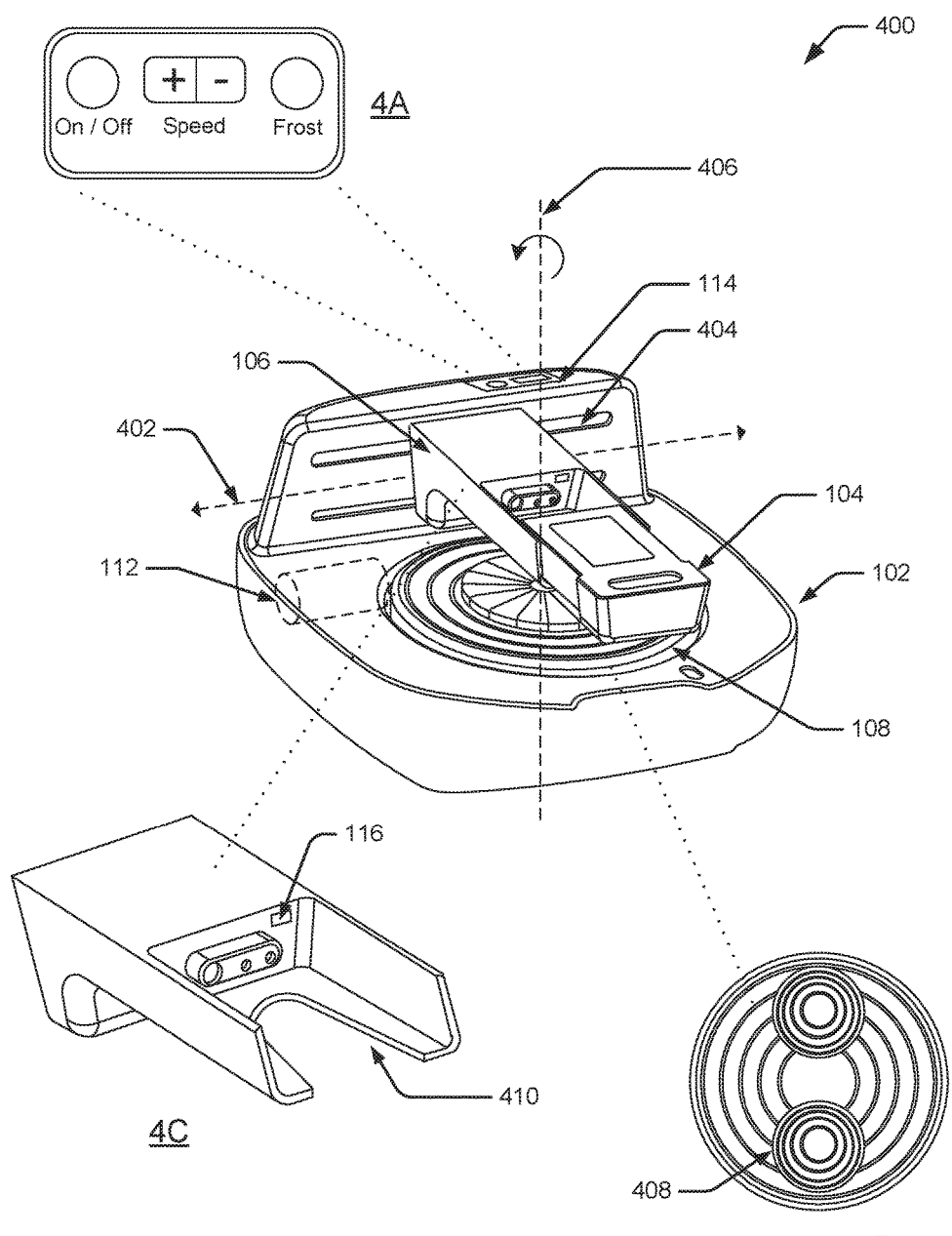
FIG. 4 illustrates another example 3D printing system.

FIG. 4 illustrates another example three-dimensional (3D) printing system 400, including the 3D printer 102. In the 3D printing system 400, the cartridge receiver 106 can be configured to be adjustable in a horizontal direction parallel to the printing platform 108, as shown on FIG. 4 with a directional line 402. To enable the horizontal motion of cartridge receiver 106, the 3D printer 102 includes rail slots 404. Other embodiments include a mechanical selector (e.g., a wheel or a crank) or a rack and pinion system (not shown on FIG. 4). The horizontal motion of the cartridge receiver 106 may be provided via a manual adjuster configured to receive manual adjustments. The manual adjuster can provide input that enables the motion to be achieved manually by a user or by the 3D printer 102 (e.g., by actuator 112). For example, the manual adjuster can be the mechanical selector described above, which receives manual adjustments from a user to power the movement of the cartridge receiver 106 (i.e., the user physically moves the cartridge receiver 106).

The manual adjuster can also be the user interface 114, which receives manual adjustments from the user and controls the actuator 112 to power the movement of the cartridge receiver 106.

The printing platform 108 can also be configured to rotate about an axis. The rotation, as shown in FIG. 4 by a rotational axis 406, is about a vertical axis perpendicular to the surface of the printing platform 108. The rotation of the printing platform 108 may be provided by the actuator 112 or manually by a user, in a similar manner to that described above with respect to the horizontal motion of the cartridge receiver 106. The rotation of the printing platform 108 enables the 3D printer 102 to extrude the edible printing material onto different regions of the printing platform 108 (e.g., extruding within differently sized concentric rings). Additionally, in combination with the horizontal motion described by the directional line 402, the rotation of the printing platform 108 enables the 3D printer to apply the edible printing material 204 to the entire printing platform 108, in curved, arced, or conic-cross-sectioned lines.

The user interface 114 enables user input to control the actuator 112. The user interface 114 includes a controller (not shown on FIG. 4) that controls operation of the actuator 112. The controller may be implemented as any suitable type of micro-controller, state machine, digital-signal processor (DSP) and the like. Detail view 4A on FIG. 4 shows an example user interface that includes controls, which can turn the actuator 112 on and off ("On/Off"), control the speed of the rotation of the printing platform 108 ("Speed"), and engage the actuation force that causes the edible printing material to be extruded ("Frost"). The 3D printer 102 as described in example environment 400, in combination with a compatible printing cartridge (e.g., the integrated printing cartridge 104 described with reference to FIGS. 2 and 3), enables 3D printing of edible printing materials at room temperature and with reduced cost, reduced complexity, or reduced risk of injury from moving parts or heated components.

Detail view 4B on FIG. 4 illustrates additional features of the printing platform 108. As noted above, the printing platform 108 may be configured to rotate about the rotational axis 406. The printing platform 108 may include one or more sub-platforms 408, each of which can rotate independently from the rotation of the printing platform 108 and each other. The independent rotation of the sub-platform 408 can be enabled by a gearing system that is related to the rotation of printing platform 108 by providing separate power from the actuator 112, by providing manual controls, and so forth.

Detail view 4C on FIG. 4 illustrates additional features of the cartridge receiver 106. As noted above, the printing cartridge 104 may include an electronic ID 308 that provides compatibility information enabling the integrated printing cartridge 104 to operate with a 3D printer (e.g., to provide an actuation force). In some embodiments of the 3D printer 102, cartridge receiver 106 may include an electronic ID reader 116 that is capable of reading the compatibility information provided by a printing cartridge (e.g., printing cartridge 104). The electronic ID reader 116 can read information in different forms, such as a bar code, a radio-frequency identification (RFID) tag, or simple text. Upon reading the information, the 3D printer 102 determines appropriate operating parameters based on the information. For example, the compatibility information may indicate the composition and viscosity of the edible printing material contained within the printing cartridge and the printer can then select a magnitude and/or a velocity for the actuation force, based upon those properties of the printing material.

The cartridge receiver 106 may also include alignment features to facilitate proper reception of a printing cartridge. As shown on FIG. 4, detail view 4C illustrates an example cartridge alignment feature 410 that comprises a tapered slot on the lower surface of the cartridge receiver 106. The example cartridge alignment feature 410 helps provide proper alignment of a printing cartridge by guiding the printing cartridge toward the center of the cartridge receiver 106.

With the structure of the 3D printer 102 detailed, the discussion turns to techniques for using the three-dimensional printer 102 for printing edible printing materials at room temperature. These techniques can be implemented using the previously described environments and entities, such as the 3D printer 102 and/or the printing cartridge 104. These techniques include methods illustrated in FIG. 4, operations of which are not necessarily limited to the orders shown. The operations can be looped, repeated, or re-ordered to implement various aspects described herein. Further, these methods may be used in conjunction with other methods described herein, in whole or in part, whether performed by the same entity, separate entities, or any combination thereof. In portions of the following discussion, reference will be made to the example 3D printing systems 100, 400, 600, and 700 of FIGS. 1, 4, 6, and 7, respectively, along with entities of FIGS. 2, 3, and 8. Such reference is not to be taken as limited to operating environments 100 or 400 but rather as illustrative of one of a variety of examples.

Figure 5:
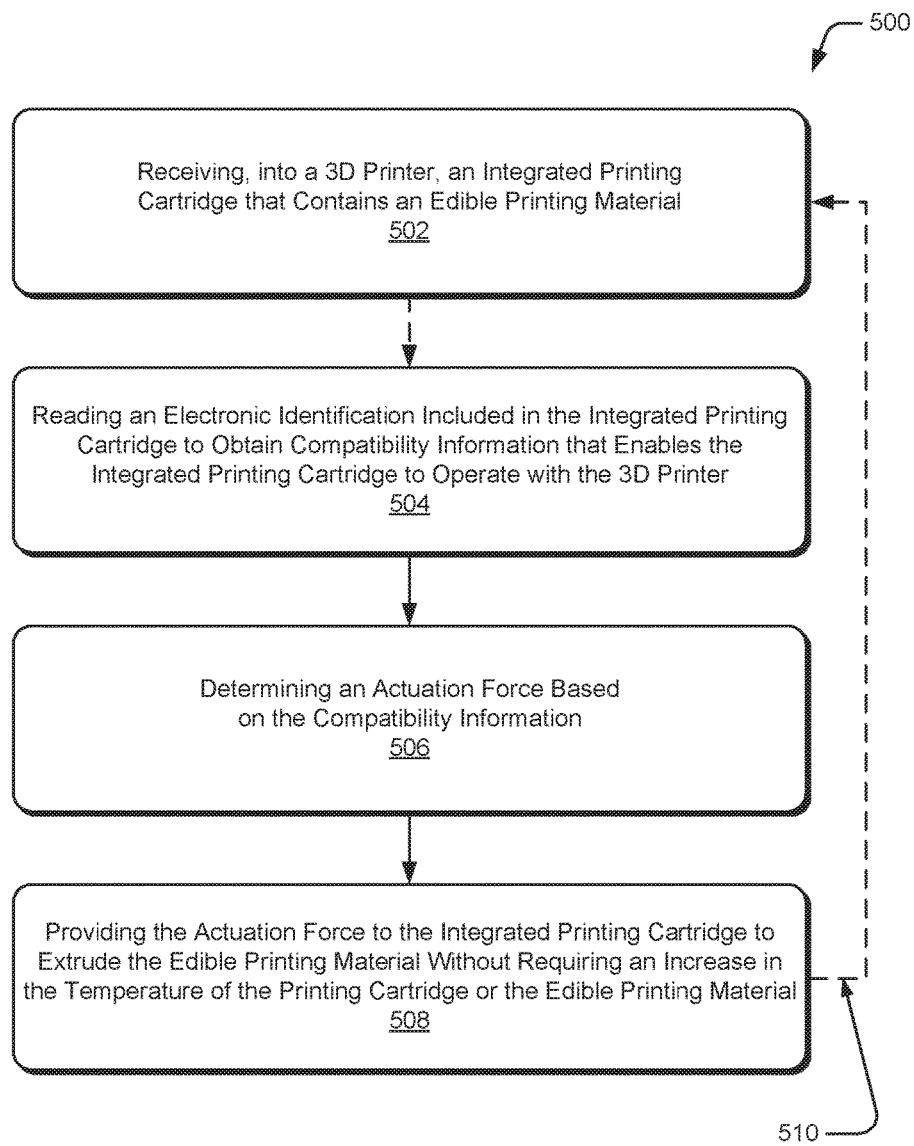
FIG. 5 illustrates an example method for 3D printing with edible printing materials at room temperature.

FIG. 5 depicts a method 500 for printing edible goods using an integrated printing cartridge with a 3D printer in accordance with one or more aspects, including operations performed by the 3D printer 102 and/or the integrated printing cartridge 104 of FIGS. 1-4.

At 502, an integrated printing cartridge containing an edible printing material is received into a 3D printer, such as the integrated printing cartridge 104, which contains an edible printing material 204, storable at room temperature and having a viscosity that allows it to be extruded at room temperature, as described above with reference to FIGS. 1-4. Note that operation 502 is not mandatory, as an integrated printing cartridge or similar may instead be received in place at purchase of the 3D printer.

At 504, the 3D printer reads an electronic identification (ID) included in the integrated printing cartridge (e.g., the electronic ID 308 of printing cartridge 104 shown on FIG. 3). The electronic ID provides compatibility information to the 3D printer that enables the integrated printing cartridge to operate with the 3D printer. In some cases, the 3D printer uses the electronic information to determine operating parameters for the 3D printer. As described above, the electronic ID may take any of a variety of forms, such as a bar code, a passive radio-frequency identification (RFID) tag, a microchip, and so forth.

At 506, the 3D printer determines an actuation force for extruding the edible printing material. The determination is based on the compatibility information. As noted, the compatibility information can include the composition and/or viscosity of the edible printing material 204. Information such as the viscosity of the edible printing material 204 can be used to determine characteristics of the actuation force (e.g., magnitude and velocity). The compatibility information can also include other information. For example, values for the coefficient of friction between the edible printing material 204 and the material of the printing tip 302 or the compressibility of the edible printing material 204 can be provided to improve the determination of the actuation force.

This information may be included as part of the compatibility information and, alone or in combination with the viscosity information, can also be used in the determination of the actuation force. Other compatibility information may include an expiration date, a color, and/or a flavor of the edible printing material 204. The expiration date information can be used to alert the user to use a different printing cartridge and the color and flavor information may be used in conjunction with other methods and techniques described in this specification.

At 508, the 3D printer provides the actuation force to the integrated printing cartridge to extrude the edible printing material from the printing cartridge. For example, as described above with reference to FIGS. 1-4, the integrated printing cartridge 104 may include the port 304. The port 304 is configured to transmit the actuation force to the edible printing material 204 contained within the integrated printing cartridge 104. The actuation force provided by the 3D printer 102 extrudes the edible printing material 204 through the printing tip 302 of the integrated printing cartridge 104 without requiring an increase of a temperature of the edible printing material 204 or an increase of a temperature of the printing tip 302.

Continuing with the example, providing the actuation force may include applying air pressure to the port 304 to apply pressure on the edible printing material 204. In this example, the edible printing material 204 is further contained within a pouch, which constrains the applied air pressure to the edible printing material 204 so that it may be extruded from the printing tip 302. In other embodiments, providing the actuation force includes applying air pressure or physical pressure to the port 304 to move a pressure plate. In this case, the actuation force acts through the motion of the pressure plate to apply pressure on the edible printing material 204, and the pressure is constrained to the edible printing material 204 by the printing cartridge 104 (e.g., by the material reservoir 202 as described above).

As shown by dashed-line arrow 510 on FIG. 5, the method may further include repeating the steps represented by blocks 502-608 using a different integrated printing cartridge containing a different edible printing material. Changing the printing cartridge allows the user to print on the same item with different colors and/or flavors. In this case, the 3D printer would read the electronic ID for the different printing cartridge and, based on the different compatibility information, provide another actuation force effective to extrude the different edible printing material.

Although embodiments of a three-dimensional printer for printing edible printing materials at room temperature have been described in language specific to features and/or methods, the subject matter of the appended claims is not necessarily limited to the specific features or methods described. Rather, the specific features and methods are disclosed as example implementations of a three-dimensional printer for printing edible printing materials at room temperature.

By way of review, the above-noted example three-dimensional (3D) printing systems 100 of FIG. 1 and 400 of FIG. 4 include the 3D printer 102 and the integrated printing cartridge 104. The 3D printer 102 includes the cartridge receiver 106, and the printing platform 108. The 3D printer 102 further includes the printer frame 110 and may also include the actuator 112, the user interface 114, and/or the electronic identification (ID) reader 116. The 3D printer 102 is configured to provide an actuation force to the printing cartridge 104 to extrude edible printing material from the printing cartridge 104 at room temperature. The printer frame 110 provides a common structure to connect the components of the 3D printer 102. The cartridge receiver 106 is mechanically connected to the printer frame 110 and is configured to receive the printing cartridge 104. The actuator 112 provides the actuation force and may be an electric motor, an air compressor, and so forth. The actuator 112 may be a single drive motor or multiple drive motors, and may be configured to generate the actuation force, rotate the printing platform 108, raise and lower the printing platform 108, move the cartridge receiver 106 in one or more directions, or any combination of those functions.

The cartridge receiver 106 can be configured to be adjustable in a horizontal direction parallel to the printing platform 108. To enable the horizontal motion of cartridge receiver 106, the 3D printer 102 may further include rail slots 404. As shown on FIG. 4, the 3D printer 102 includes two rail slots 404. Other embodiments can include a different number of rail slots 404, or other methods of enabling the motion. The printing platform 108 can also be configured to rotate about an axis. The rotation, as shown in FIG. 4 by a rotational axis 406, is about a vertical axis perpendicular to the surface of the printing platform 108. The horizontal motion of the cartridge receiver 106 and the rotation of the printing platform 108 may be provided by the actuator 112 or manually by a user.

Figure 6:
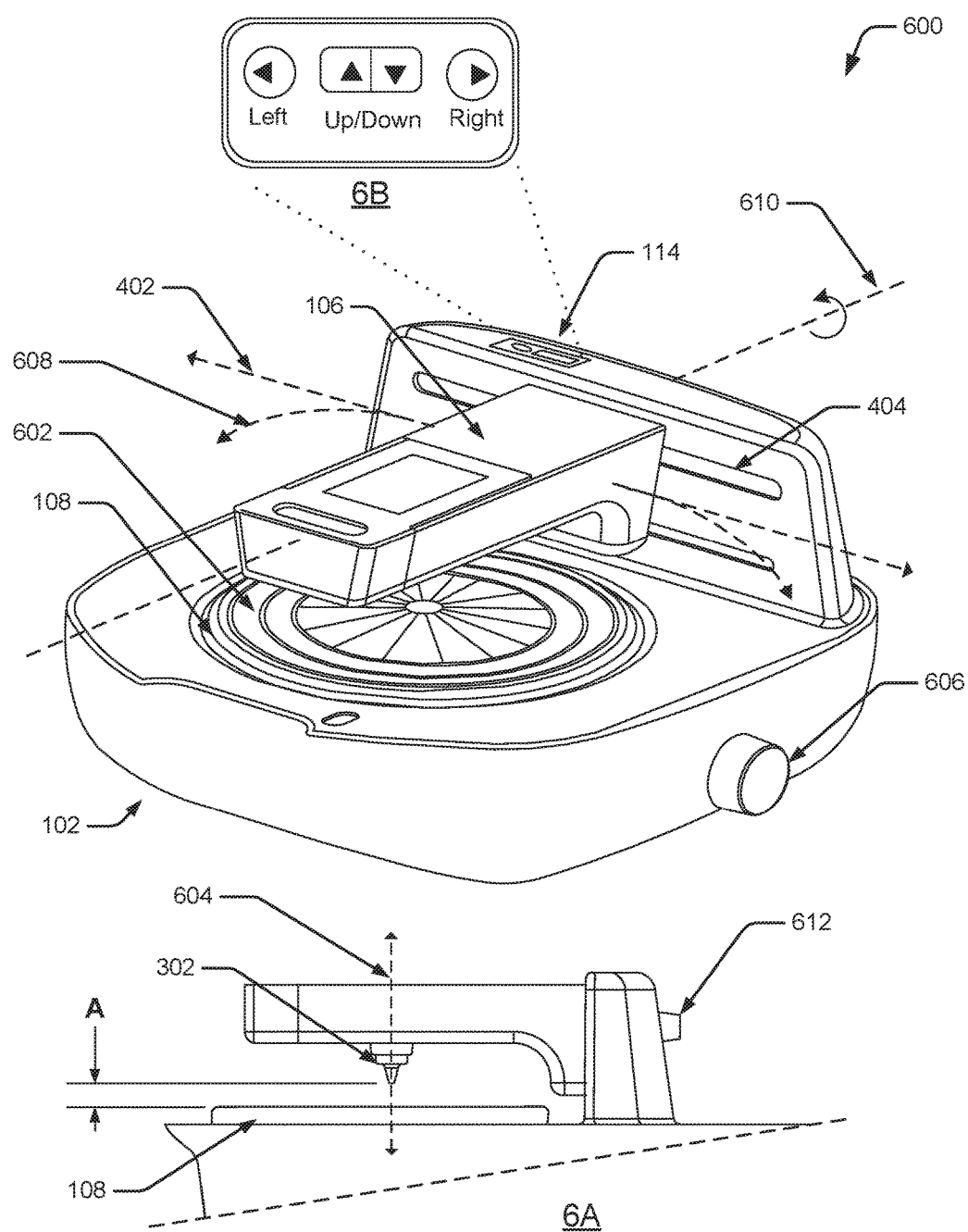
FIG. 6 illustrates another example 3D printing system.

FIG. 6 illustrates another example three-dimensional (3D) printing system 600, including the 3D printer 102. In 3D printing system 600, the printing platform 108 includes a printing target 602 that enables an item to be placed on the printing platform 108 for printing at a precise and repeatable location. Additional details of the printing target 602 are described below.

The printing platform 108 can be configured be adjustable in a vertical direction. Detail view 6A of FIG. 6 is a partial side view of the 3D printer 102, illustrating the vertical adjustment of printing platform 108 with a directional arrow 604. The vertical adjustment of the printing platform 108 allows the distance between the printing platform 108 and the printing tip 302 (shown by dimension A on FIG. 6) to be increased or decreased as necessary to perform the desired printing operations. To enable the vertical adjustment of the printing platform 108, the 3D printer 102 may further include a mechanical lift (not shown on FIG. 6). The mechanical lift can be a mechanical selector 606 (e.g., a wheel or a crank) coupled to a worm drive, a rack and pinion system, and so forth. The vertical adjustment of the printing platform 108 may be provided via a manual adjuster configured to receive manual adjustments. The manual adjuster can provide input that enables the motion to be achieved manually by a user or by the 3D printer 102 (e.g., by actuator 112). For example, the manual adjuster can be the mechanical selector 606 described above, which receives manual adjustments from a user to power the movement of the printing platform 108. The manual adjuster can also be the user interface 114, which receives manual adjustments from the user and controls the actuator 112 to power the movement of the cartridge receiver 106.

The cartridge receiver 106 can be configured to enable adjustments to its position and orientation with respect to the printing platform 108. As described above with reference to FIG. 4, the cartridge receiver 106 can be configured to be adjustable in a horizontal direction parallel to the printing platform 108 using rail slots 404. The cartridge receiver 106 can be further configured to be adjusted in an arc direction.

The arc direction may be a single arced movement that has a component perpendicular to the vertical direction in which the printing platform 108 can be adjusted and a component parallel to the vertical direction. An example of the arced movement is shown on FIG. 6 as line 608. To enable the arced movement of cartridge receiver 106, the 3D printer 102 may include arced rail slots (not shown on FIG. 6) instead of, or in addition to, the rail slots 404. Other embodiments may include a different number of rail slots or the cartridge receiver 106 may be mounted on a pivoting member with a slot for radial adjustment, and so forth. In still other embodiments, the cartridge receiver may be configured to rotate about an axis such as the axis 610 of FIG. 6. In this embodiment, the cartridge receiver 106 moves horizontally, for example via the rail slots 404, and rotates about the axis 610 to provide motion in arcs with small radii.

The arced movement of the cartridge receiver 106 may be provided via a manual adjuster configured to receive manual adjustments. The manual adjuster can provide input that enables the motion to be achieved manually by a user or by the 3D printer 102 (e.g., by the actuator 112). For example, the manual adjuster can be another mechanical selector, such as the mechanical selector 612 of FIG. 6, which receives manual adjustments from a user to power the arced movement of the cartridge receiver 106. The manual adjuster can also be the user interface 114, which receives manual adjustments from the user and controls the actuator 112 to power the arced movement of the cartridge receiver 106.

As described above, the user interface 114 enables user input to control the actuator 112. The user interface 114 includes a controller (not shown on FIG. 6) that controls operation of the actuator 112. The controller may be implemented as any suitable type of micro-controller, state machine, digital-signal processor (DSP) and the like. Detail view 6B on FIG. 6 shows an example user interface that includes controls, which can receive a first input to control the actuator 112 to adjust the printing platform 108 in a vertical direction ("Up/Down"), a second input to adjust the position of the cartridge receiver 106 in a horizontal direction ("Left" or "Right") or in an arced movement as described above (e.g., a combination of "Up" and "Left", "Down" and "Right", and so forth), or a combination of inputs for more complex motion.

The 3D printer 102 as described in example environment 600, in combination with a compatible printing cartridge (e.g., the integrated printing cartridge 104 described with reference to FIGS. 1-4), enables 3D printing of edible printing materials at room temperature and with reduced cost, reduced complexity, or reduced risk of injury from moving parts or heated components. Additionally the vertical adjustment of the printing platform 108 enables the 3D printer 102 to extrude the edible printing material in stacked layers or onto different regions of an edible item being printed on (e.g., to fill in a depression in the edible item). As described above, printing platform 108 can rotate about an axis and move up and down in a vertical direction. In combination with the horizontal and arced motion of the cartridge receiver 106 (also described above), the 3D printer 102 can apply the edible printing material 204 to the entire printing platform 108, in curved, arced, or conic-cross-sectioned lines and in multiple layers. Consider an example in which a cupcake is placed on the rotating printing platform 108. By raising and lowering the printing platform 108 and adjusting the cartridge receiver (horizontally and in various arcs), a user could print the edible printing material 204 on the sides and top of the cupcake in a single layer or multiple layers, and include a decorative design on the cupcake's domed surface.

Figure 7:
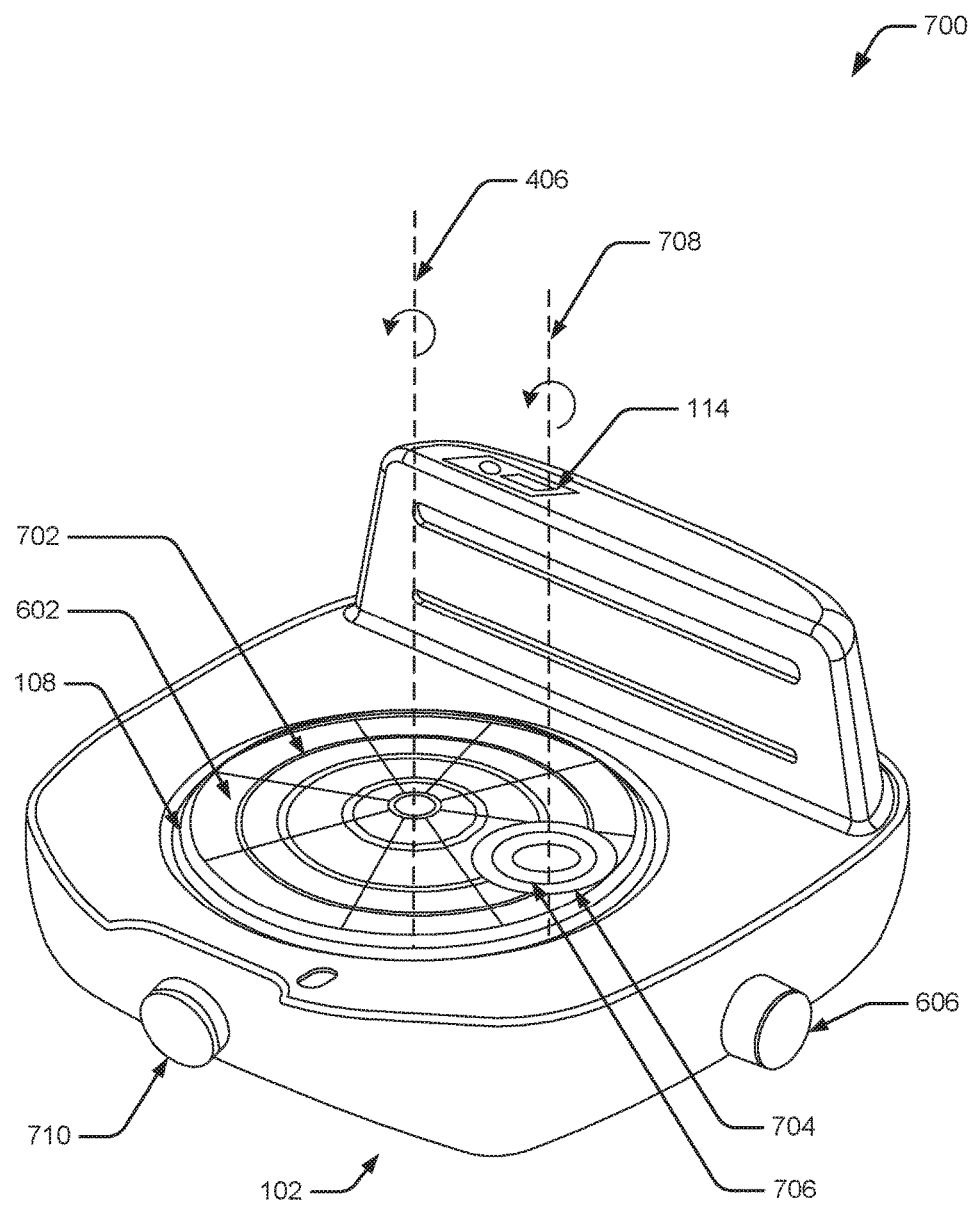
FIG. 7 illustrates another example 3D printing system.

FIG. 7 illustrates another example three-dimensional (3D) printing system 700, including the 3D printer 102 as described above with reference to FIG. 6. The 3D printer of 3D printing system 700 includes the printing platform 108, which can be adjusted in a vertical direction, and the cartridge receiver 106, which can be adjusted horizontally and/or in arced movements. The cartridge receiver 106 is omitted from FIG. 7 to show additional details of the printing target 602.

The printing target 602 includes multiple recessed grooves 702 arranged concentrically around the rotational axis 406 of the printing platform 108 or radiating outward from the rotational axis 406. As shown on FIG. 7, the concentric grooves 702 are circular, but other shapes may be used, as described in further detail below. The grooves are recessed so as not interfere with items placed or printed on the printing platform 108. The printing target 602 may be integrated as part of the printing platform 108. For example, the recessed grooves 702 could be recessed in the surface of the printing platform 108 itself. In other embodiments, however, the printing target 602 can be a removable surface that attaches to the printing platform 108.

The recessed grooves 702 on printing target 602 enable items to be placed or printed on the printing platform 108 at a precise and repeatable location by creating a reference for use when printing edible items or adding edible printing material to items placed on the printing target 602. For example, if a user wants to add a decorative design to a round cookie, the user can place the cookie in the center of a concentric circle that is close to the same size as the cookie. The relatively similar sizes of the target and the cookie enable a user to place items at a precise and repeatable location. The radial lines can be used in an analogous manner to align items with straight edges or to provide a reference to use when printing lines across items on the printing target 602.

The printing platform 108 may also include an additional printing target 704. The additional printing target 704 may be included with a sub-platform 408 (described in FIG. 4) or be part of the printing platform 108. The additional printing target 704 also includes multiple recessed grooves 706. The arrangement of the recessed grooves 706 of the additional printing target 704 may be the same as those of the printing target 602 or have a different arrangement. As shown in FIG. 7, the recessed grooves 706 are arranged concentrically around a separate rotational axis 708 of the additional printing target 704. In embodiments in which the additional printing target 704 is part of the sub-platform 408, the rotation of the additional printing target 704 may be independent from the rotation of printing target 602 (e.g., by using a gearing system). Other embodiments may provide for synchronized rotation of the two printing targets.

As described above, the rotation of the printing platform 108 may be provided by manually by a user, such as by a mechanical selector 710 in combination with a worm drive or a rack and pinion system (not shown on FIG. 7). In other embodiments, the rotation may be provided via the actuator 112. For example, the rotation of the printing platform 108 and printing target 602 may be provided via a manual adjuster configured to receive manual adjustments. The manual adjuster can provide input that enables the motion to be achieved manually by a user or by the 3D printer 102 (e.g., by actuator 112). The manual adjuster can be the mechanical selector 710, which receives manual adjustments from a user to rotate the printing platform 108 and printing target 602 or the manual adjuster can be the user interface 114, which receives manual adjustments from the user and controls the actuator 112 to power the rotation of the printing platform 108 and printing target 602. The 3D printer 102 as described in example environment 700, in combination with a compatible printing cartridge (e.g., the integrated printing cartridge 104 described with reference to FIGS. 2 and 3), enables 3D printing of edible printing materials at room temperature and with reduced cost, reduced complexity, or reduced risk of injury from moving parts or heated components.

Figure 8:
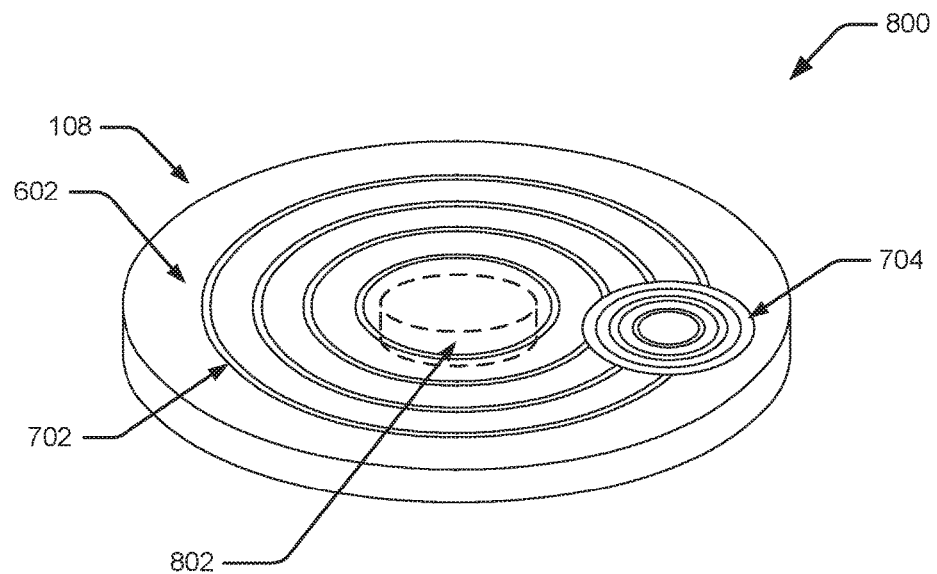
FIG. 8 illustrates a removable printing platform for a 3D printer.
Figure 8:
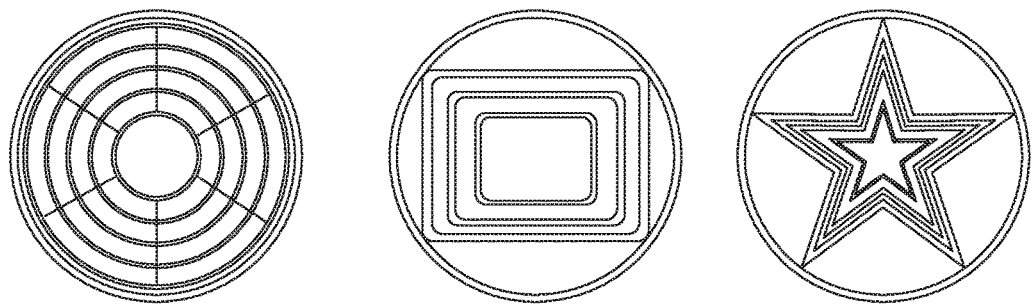

FIG. 8 illustrates a removable printing platform assembly 800 for a three-dimensional (3D) printer. The printing platform assembly 800 includes the printing platform 108, the printing target 602 (including recessed grooves 702), and a connector 802. The connector 802 may take one of a number of forms (e.g., a threaded fastener, a press-fit connector, and so forth), and is configured to connect the printing platform assembly 800 to the 3D printer to enable the printing platform 108 to be rotatable about an axis (e.g., axis 406 of FIGS. 4 and 7) and adjustable in a vertical direction, as described above.

The printing platform assembly 800 may also include one or more of the sub-platforms 408 that include an additional printing target, such as additional printing target 704, described above. When the printing platform assembly 800 includes an additional printing target 704, the connector 802 is configured to enable the printing target 602 and the additional printing target 704 to rotate independent from each other or with synchronized motion, as described above.

In FIG. 8, the printing target 602 and the additional printing target 704 are shown having a pattern of recessed grooves in concentric circles about their centers. Other configurations are also possible. For example, as shown in detail view 8A, the recessed grooves can be configured in a pattern with concentric circles about the center that also includes lines radiating outward from the center, in a pattern with nested rectangles, in a pattern with nested five-point stars, and so forth. The printing platform assembly 800 as described in FIG. 8, in combination with the 3D printer 102 and a compatible printing cartridge (e.g., the integrated printing cartridge 104 described with reference to FIGS. 2 and 3), enables 3D printing of edible printing materials at room temperature and enables even first-time users to place or print items in the desired location with precision and repeatability.

Figure 9:
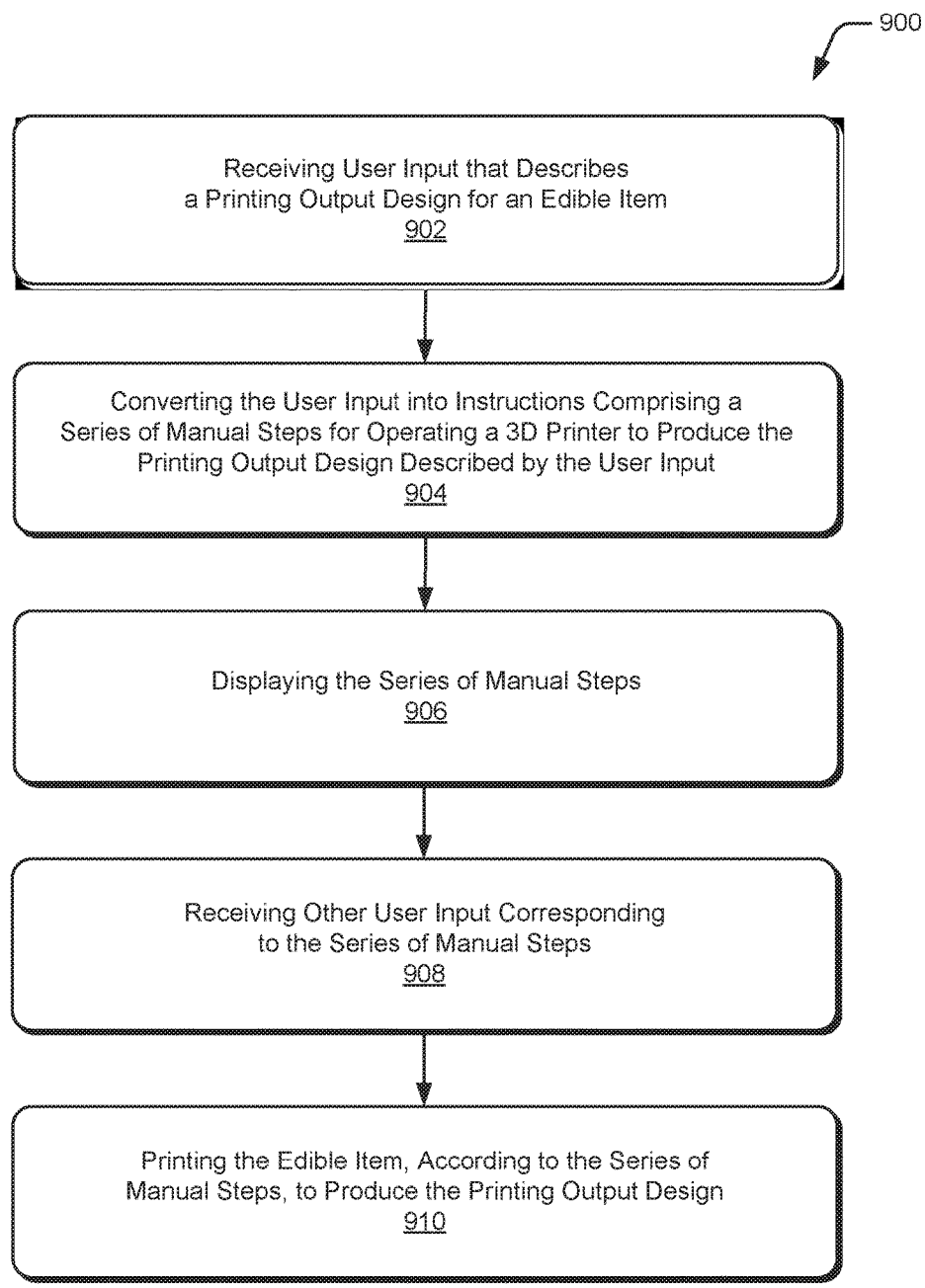
FIG. 9 illustrates an example method for 3D printing customized edible goods at room temperature.

FIG. 9 depicts another method 900 for printing customized edible goods at room temperature with a three-dimensional (3D) printer, in accordance with one or more aspects, including operations performed by the 3D printer 102 and/or the integrated printing cartridge 104 of FIGS. 1-4, 6, and 7.

At 902, user input that describes a printing output design for an edible item material is received by a 3D printer. The user input may be a selection of a particular edible printing material and/or flavor for the edible item, a selection of a shape for the edible item, a color for the edible printing material, or an image of the desired printing output design. The user input may be received via a user interface of the 3D printer or via a user interface of a remote device (e.g., a mobile computing device). As noted, the 3D printer could be the 3D printer 102 described above, including the integrated printing cartridge 104, which contains an edible printing material 204, storable at room temperature and having a viscosity that allows it to be extruded at room temperature, and which may also include features such as controllers, user interfaces, adjustable components, printing targets, and/or other features as described above with reference to FIGS. 1-8.

At 904, the user input is converted into instructions that enable the 3D printer to produce the printing output design that is described by the user input. The instructions are a series of manual steps for operating the 3D printer 102 to print the printing output design. For example, the printing output design described by the user input may be a circle. The series of manual steps to print the circle may be as follows: place an item on the printing platform 108 in the center of the appropriate printing target (e.g., printing target 602), adjust the horizontal location of the printing cartridge to the desired radius for the circle (for example, by adjusting cartridge receiver 106), activate the 3D printer 102, rotate the printing platform 108 one rotation, and deactivate the 3D printer 102. The conversion may be performed by any of a variety of public and/or proprietary techniques, including speech-to-text, optical character recognition (OCR), and so forth.

At 906, the series of manual steps are displayed. The series of manual steps may be displayed on a display of the 3D printer, or the display of a remote device, and may be displayed as a graphical description of the manual steps, a textual description of the manual steps, or a combination of graphical and textual description.

At 908, other user input, corresponding to the series of manual steps, is received by the 3D printer. The other user input may be manual operation of the 3D printer according the series of manual steps. Continuing the above example, the other user input is as follows; placing an item on the printing platform 108 in the center of the appropriate printing target (e.g., printing target 602), adjusting the horizontal location of the printing cartridge to the desired radius for the circle (for example, by adjusting cartridge receiver 106), activating the 3D printer 102, rotating the printing platform 108 one rotation, and deactivating the 3D printer 102.

At 910, the edible item is printed according the series of manual steps to produce a printed edible item that conforms to the printing output design.

Figure 10:
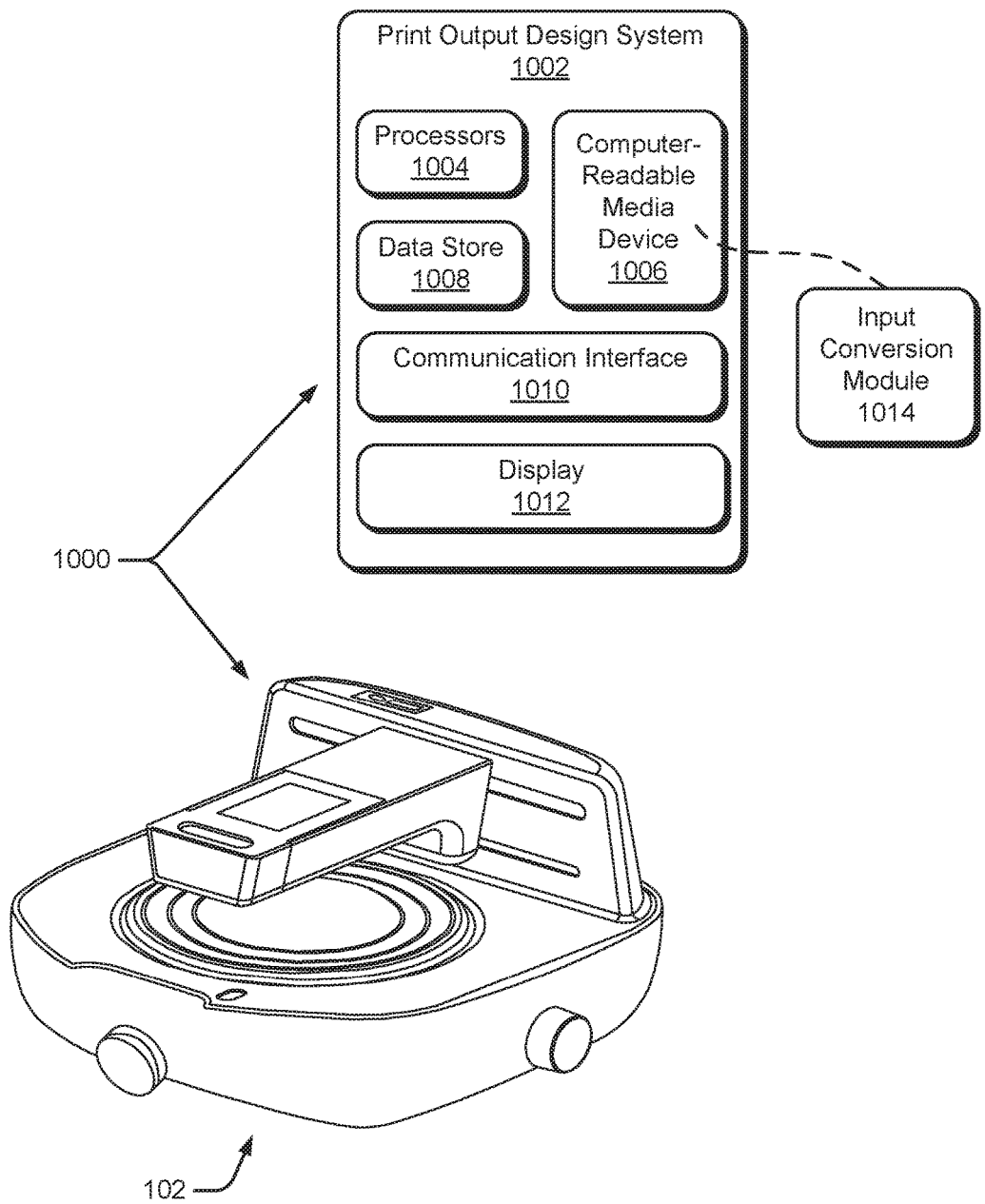
FIG. 10 illustrates another example 3D printing system.

FIG. 10 illustrates another example three-dimensional (3D) printing system 1100, including a 3D printer and a print output design system 1002. The 3D printer may be the 3D printer 102 as described above with reference to FIGS. 1, 4, 6, and 7 and can further include the devices described in FIGS. 2, 3, and 8. For clarity, however, FIG. 10 does not show every feature described above with reference to FIGS. 1-9.

The print output design system 1002 includes one or more processors 1004, a computer-readable media device 1006, a data store 1008, and a communication interface 1010 to allow communication and control of the print output design system 1002 and/or the 3D printer 102. The communication interface 1010 can be presented on a display 1012 or provided in other manners (e.g., as part of user interface 114). Additionally, the print output design system 1002 can implement an input conversion module 1014, shown included within the computer-readable media device 1006. While shown within the computer-readable media device 1006, the module may be computer-readable instructions, hardware, firmware, or some combination thereof.

The print output design system 1002 can receive user input describing a printing output design for an edible item. As noted above with reference to FIG. 8, the user input may be a selection of a particular edible printing material and/or flavor for the edible item, a selection of a shape for the edible item, a color for the edible printing material, an image of the desired printing output design, and so forth. The user input may be received via a user interface of the 3D printer or via a user interface of a remote device (e.g., a mobile computing device). The print output design system 1002 then converts the user input into instructions or information that enables the 3D printer to produce the printing output design that is described by the user input. The conversion may be performed by a module such as the input conversion module 1014.

Figure 11:
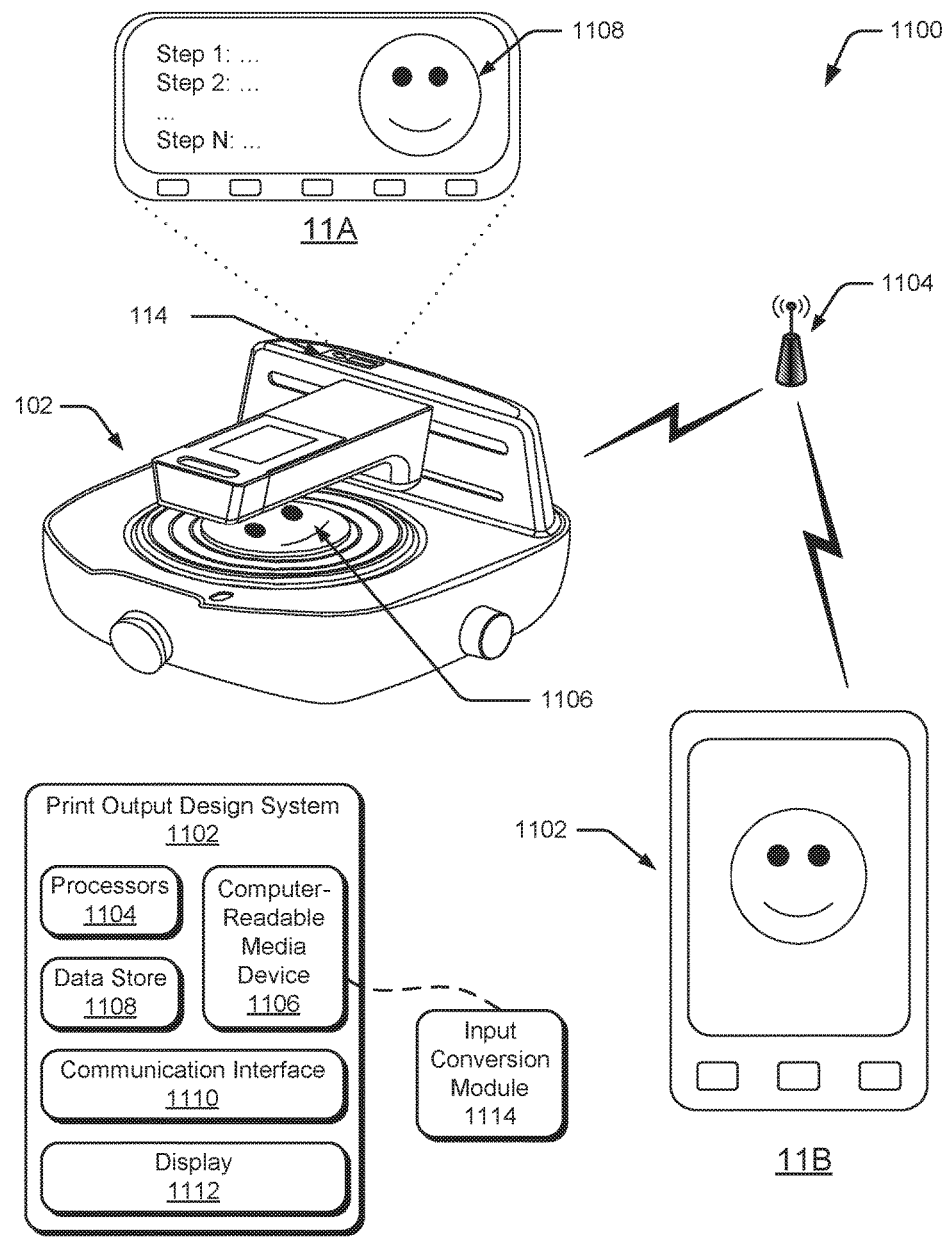
FIG. 11 illustrates additional features and details of the 3D printing system illustrated above.

FIG. 11 illustrates additional features and details of the image system 1100 and the 3D printer 102. Detail view 1100 illustrates the 3D printer 102 in communication with a remote device 1102 via network 1104. The network 1104 may be wired or wireless, including a local area network (LAN), an intranet, a cellular network, the Internet, and so forth. As noted, the print output design system 1002 includes a communication interface 1010 that enables communication and control of the print output design system 1002 and/or the 3D printer 102. Detail view 11A illustrates an example user interface 114 that includes the display 1012. User interface 114 is also configured to connect to the network 1104 (e.g., using communication interface 1010). Detail view 11B shows the remote device 1102, including a user interface that can receive user input to produce the printing output design.

The instructions may be a series of manual steps for operating the 3D printer 102 to print the printing output design that are displayed for a user. For example, the series of manual steps may be displayed on a display of the 3D printer 102 (e.g., the user interface 114 shown in detail view 11A), or the display of a remote device, and may be displayed as a graphical description of the manual steps, a textual description of the manual steps, or a combination of graphical and textual description. The text and/or graphics used to display the series of manual steps may be stored locally, for example in data store 1008 of the print output design system 1002, or retrieved from another source (e.g., via network 1104).

Other user input, corresponding to the series of manual steps, is then received, and the edible item is printed according to the series of manual steps to print the printing output design. Continuing the non-limiting example described above with reference to FIG. 8, the series of manual steps are displayed on the example user interface 114 as shown in detail view 11A and, by performing the steps as displayed, an edible item 1106 is printed that conforms to the printing output design (e.g., example printing output design 1108 shown on detail view 11A).

As noted above, in some embodiments, the user input may be converted into information that enables the 3D printer to produce the printing output design that is described by the user input. For example, the print output design system 1002 (e.g. using the input conversion module 1014) may convert the user input into information in the form of printer language instructions that can control the 3D printer to automatically print the printing output design. Consider the 3D printer 102 described with reference to FIGS. 1, 4, 6, and 7, which includes the actuator 112 that can automatically operate the printing platform 108 (e.g., rotation and/or vertical adjustment), control the horizontal location of the printing cartridge 104 by adjusting the cartridge receiver, and extrude edible printing material 204 by providing an actuation force to the printing cartridge 104. The printer language instructions can control the actuator 112 to operate the printing platform 108, operate the cartridge receiver 106, and provide an actuation force to the integrated printing cartridge 104 such that the edible item is printed according to the printing output design.

Although embodiments of a three-dimensional printer for printing edible printing materials at room temperature have been described in language specific to features and/or methods, the subject matter of the appended claims is not necessarily limited to the specific features or methods described. Rather, the specific features and methods are disclosed as example implementations of a three-dimensional printer for printing edible printing materials at room temperature.

What is claimed is:

1. A three-dimensional (3D) printer configured to print edible goods by extruding edible printing material at room temperature, comprising:
   a printer frame;
   a printing platform connected to the printer frame and including a printing target enabling an item to be placed on the printing platform at a precise and repeatable location;
   a cartridge receiver connected to the printer frame and configured to hold a printing cartridge containing an edible printing material, the edible printing material having a viscosity allowing the edible printing material to be extruded at room temperature;
   a user interface configured to receive a first input and a second input, the first input being a selection of a first control on the user interface, and the second input being a selection of a second control on the user interface; and
   an actuator connected to the frame and configured to:
      adjust, responsive to the selection of the first control on the user interface, a position of the printing platform in a vertical direction;
      adjust, responsive to the selection of the second control on the user interface, a position of the cartridge receiver in a direction perpendicular to the vertical direction;
      generate an actuation force; and
      apply the actuation force to the printing cartridge, the application of the actuation force effective to extrude the edible printing material through a printing tip of the printing cartridge and onto an item presented on the printing platform, the extrusion performed without requiring an increase in a temperature of the edible printing material or a temperature of the printing tip.

2. The 3D printer of claim 1, wherein the second input is effective to adjust the position of the cartridge receiver in a direction that comprises a single arced movement having a component perpendicular to the vertical direction and a component parallel to the vertical direction.

3. The 3D printer of claim 2, wherein the second input is a user-powered manual input.

4. The 3D printer of claim 1, further comprising:
   another actuator configured to:
   adjust, responsive to the selection of the second control on the user interface, the position of the cartridge receiver in another direction.

5. The 3D printer of claim 4, wherein the other actuator is further configured to adjust, responsive to the selection of the second control on the user interface, the position of the cartridge receiver in a direction that has at least one component in the vertical direction and at least one component in the other direction.

6. The 3D printer of claim 1, wherein room temperature comprises a range of temperatures from 50 degrees Fahrenheit to 90 degrees Fahrenheit.

7. A three-dimensional (3D) printer configured to print edible goods by extruding edible printing material at room temperature, comprising:
   a printer frame;
   a cartridge receiver connected to the printer frame and configured to hold a printing cartridge containing an edible printing material, the edible printing material being storable at room temperature and having a viscosity allowing extrusion of the edible printing material at room temperature; and
   a rotatable printing platform connected to the printer frame, having a first printing target and second printing target, and configured to receive an input effective to adjust a position of the rotatable printing platform in a vertical direction and capable of receiving a first item on which the edible printing material can be printed and a second item on which the edible printing material can be printed, the first printing target enabling the first item to be placed on the rotatable printing platform at a first precise and repeatable location, the second printing target enabling the second item to be placed on the rotatable printing platform at a second precise and repeatable location, and the first printing target and the second printing target configured to rotate independently from each other.

8. The 3D printer of claim 7, wherein the rotatable printing platform further includes a removable printing surface on which the first printing target and the second printing target are integrated.

9. The 3D printer of claim 7, wherein the 3D printer further comprises an actuator, the actuator enabling the rotation of the printing platform, the first printing target, and the second printing target.

10. The 3D printer of claim 7, wherein room temperature comprises a range of temperatures from 50 degrees Fahrenheit to 90 degrees Fahrenheit.

11. The 3D printer of claim 7, wherein the rotatable printing platform is configured to be rotated via a user-powered mechanical manual input.

12. The 3D printer of claim 7, wherein the 3D printer further comprises an actuator, the actuator configured to rotate the rotatable printing platform and the first printing target or the second printing target.

13. A method for printing an edible printing material at room temperature using a three-dimensional (3D) printer that includes a printer frame, a printing platform connected to the printer frame and including a printing target enabling an item to be placed on the printing platform at a precise and repeatable location, a cartridge receiver connected to the printer frame, a user interface to receive input from a user, and an actuator operably coupled to the printing platform, the method comprising:
   holding, by the cartridge receiver, a printing cartridge containing an edible printing material, the edible printing material having a viscosity allowing the edible printing material to be extruded at room temperature;
   receiving, by the user interface, a first input and a second input, the first input being a selection of a first control on the user interface, and the second input being a selection of a second control on the user interface;
   responsive to the selection of the first control on the user interface, adjusting via the actuator, a position of the printing platform in a vertical direction;

responsive to the selection of the second control on the user interface, adjusting via the actuator, a position of the cartridge receiver in a direction perpendicular to the vertical direction;

generating, via the actuator, an actuation force; and applying the actuation force of the actuator to the printing cartridge, the application of the actuation force effective to extrude the edible printing material through a printing tip of the printing cartridge and onto an item presented on the printing platform, the extrusion performed without requiring an increase in a temperature of the edible printing material or a temperature of the printing tip.

14. The method of claim 13, further comprising:

in response to the second input, adjusting the position of the cartridge receiver in a direction that comprises an arced movement having a component perpendicular to the vertical direction and a component parallel to the vertical direction.

15. The method of claim 13, wherein the 3D printer includes another actuator and the method further comprising:

adjusting, by the other actuator and responsive to the selection of the first control on the user interface, the position of the printing platform in the vertical direction; and adjusting, by the other actuator and responsive to the selection of the second control on the user interface, the position of the cartridge receiver in a direction perpendicular to the vertical direction.

16. The method of claim 15, further comprising:

adjusting, by the other actuator and responsive to the selection of the second control on the user interface, the position of the cartridge receiver in a direction that has at least one component in the vertical direction and at least one component in another direction.

* * * * *